US010405151B2

(12) United States Patent
Dudarev et al.

(10) Patent No.: US 10,405,151 B2
(45) Date of Patent: *Sep. 3, 2019

(54) SIMULTANEOUS MESSAGING SYSTEMS AND METHODS

(71) Applicant: Insurance Supermarket Inc., Concord (CA)

(72) Inventors: Leo Dudarev, Toronto (CA); Charles Nastaskin, Richmond Hill (CA); Alex Dudarev, Thornhill (CA)

(73) Assignee: INSURANCE SUPERMARKET INC., Concord, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/166,358

(22) Filed: Oct. 22, 2018

(65) Prior Publication Data

US 2019/0124484 A1    Apr. 25, 2019

Related U.S. Application Data

(63) Continuation of application No. 15/651,458, filed on Jul. 17, 2017, now Pat. No. 10,149,127, which is a
(Continued)

(51) Int. Cl.
*H04W 4/21* (2018.01)
*H04W 4/02* (2018.01)
(Continued)

(52) U.S. Cl.
CPC ......... *H04W 4/21* (2018.02); *H04M 3/42357* (2013.01); *H04W 4/023* (2013.01);
(Continued)

(58) Field of Classification Search
CPC ....... H04W 4/206; H04W 4/21; H04W 76/10; H04W 4/023; H04M 3/42357;
(Continued)

(56) References Cited

U.S. PATENT DOCUMENTS

| 7,260,603 | B1 * | 8/2007 | Masciantonio | G06Q 30/02 |
| | | | | 707/999.01 |
| 8,639,263 | B2 * | 1/2014 | Salmon | H04W 4/02 |
| | | | | 340/539.11 |

(Continued)

OTHER PUBLICATIONS

Notice of Allowance and Fee(s) Due, Notice of Allowability, and Notice of References Cited dated Apr. 24, 2017 in corresponding U.S. Appl. No. 15/182,029.
(Continued)

*Primary Examiner* — Michael Y Mapa
(74) *Attorney, Agent, or Firm* — Bereskin & Parr LLP/S.E.N.C.R.L., s.r.l.; Isis E. Caulder; Joanna Cheuk-Yu Ma

(57) ABSTRACT

At least one of the embodiments described herein relate generally to a method of communicating an engagement to a plurality of active mobile devices, wherein each active mobile device is associated with an active user. The method may include providing at least one communication socket to each of the active mobile devices; receiving location data from those devices including information related to an engagement. In response to receiving the engagement location, a qualified active mobile device can be identified near the engagement location. The selected qualified active mobile device can correspond to the qualified user account with a preferred record.

16 Claims, 10 Drawing Sheets

Related U.S. Application Data continuation-in-part of application No. 15/182,029, filed on Jun. 14, 2016, now Pat. No. 9,756,492.

(51) Int. Cl.

| | |
|---|---|
| *H04M 3/42* | (2006.01) |
| *H04W 76/10* | (2018.01) |
| *G06Q 40/08* | (2012.01) |
| *G06Q 10/10* | (2012.01) |
| *G06Q 30/00* | (2012.01) |

(52) U.S. Cl.
CPC .......... *H04W 76/10* (2018.02); *G06Q 10/109* (2013.01); *G06Q 30/01* (2013.01); *G06Q 40/08* (2013.01); *H04M 2242/14* (2013.01)

(58) Field of Classification Search
CPC . H04M 2242/14; G06Q 10/109; G06Q 30/01; G06Q 40/08
USPC .. 455/412.1–412.2, 414.1–414.2, 456.1–457
See application file for complete search history.

(56) References Cited

U.S. PATENT DOCUMENTS

| | | | |
|---|---|---|---|
| 2002/0013153 A1 | 1/2002 | Wilcock et al. | |
| 2005/0101335 A1* | 5/2005 | Kelly | G06Q 10/109 |
| | | | 455/456.3 |
| 2009/0247208 A1* | 10/2009 | Lohmar | H04L 12/189 |
| | | | 455/519 |
| 2011/0145159 A1 | 6/2011 | Wilson et al. | |
| 2013/0297329 A1 | 11/2013 | Banthia et al. | |
| 2013/0304657 A1* | 11/2013 | Miller | G06Q 50/16 |
| | | | 705/313 |
| 2014/0244275 A1 | 8/2014 | Parthasarathy | |
| 2014/0249878 A1 | 9/2014 | Kaufman | |
| 2015/0373489 A1* | 12/2015 | Li | H04W 4/21 |
| | | | 455/456.1 |
| 2016/0277869 A1* | 9/2016 | Mulayev | H04W 4/60 |
| 2016/0335694 A1 | 11/2016 | Catino et al. | |
| 2016/0379173 A1* | 12/2016 | Karnati | G06Q 10/1095 |
| | | | 705/7.19 |
| 2017/0249706 A1 | 8/2017 | Gill | |

OTHER PUBLICATIONS

International Search Report and Written Opinion dated Sep. 11, 2017 in corresponding International Patent Application No. PCT/CA2017/050725.

Non-final Office Action and Notices of References Cited dated Mar. 7, 2018 in corresponding Continuation-in-Part U.S. Appl. No. 15/651,458.

Notice of Allowance and Fee(s) Due, Notice of Allowability, and Notice of References Cited dated Jul. 23, 2018 in corresponding Continuation-in-Part U.S. Appl. No. 15/651,458.

\* cited by examiner

SIMULTANEOUS MESSAGING SYSTEMS AND METHODS

CROSS-REFERENCE TO RELATED PATENT APPLICATIONS

This application is a continuation of U.S. patent application Ser. No. 15/651,458 filed on Jul. 17, 2017 and titled "SIMULTANEOUS MESSAGING SYSTEMS AND METHODS", which is a continuation-in-part of U.S. patent application Ser. No. 15/182,029 filed on Jun. 14, 2016 and titled "SIMULTANEOUS MESSAGING SYSTEM AND METHOD" (now U.S. Pat. No. 9,756,492 issued on Sep. 5, 2017). The complete disclosure of each of U.S. patent application Ser. Nos. 15/182,029 and 15/651,458 is incorporated herein by reference.

FIELD

The embodiments described herein relate to systems and methods of distributing notifications and in particular to a plurality of recipients.

BACKGROUND

Consumers that desire certain products and services may seek out vendors or information through a number of sources including word of mouth, printed advertising via publications such as the YellowPages™ or newspaper classifieds, and the Internet. In general, a significant amount of time may pass between the consumer's initial research and the consumer obtaining the product or service. A portion of this delay may be the result of the consumer spending too much time researching due to lack of knowledge, the inability to identify a suitable product or service as a result of too many choices, or delays associated with finding someone knowledgeable for assistance (e.g. the person with knowledge is not available to scheduling issues).

Therefore, it is desirable reduce this delay so as to enable consumers to quickly obtain information or products they desire, and for service providers and merchants to have a way to quickly identify consumers who desire their specific products and services so as to help increase the likelihood of a successful sale.

SUMMARY

The various embodiments described herein generally relate to methods and systems of communicating an engagement.

In accordance with an embodiment, there is provided a method of communicating an engagement to a plurality of active mobile devices. Each active mobile device is associated with an active user. The method includes: providing at least one data communication socket for each active mobile device in the plurality of active mobile devices, wherein the at least one data communication socket includes a location data communication socket and a secondary data communication socket; receiving a plurality of location data streams, wherein each location data stream includes location data corresponding to a physical location of each active mobile device, and wherein the location data is communicated via the location data communication socket; receiving engagement information including at least an engagement location; in response to receiving the engagement information, identifying one or more qualified active mobile devices near the engagement location, wherein identifying the one or more qualified active mobile device includes: (i) detecting a set of nearby active mobile devices, wherein the set of nearby active mobile devices includes one or more active mobile devices within a proximity threshold of the engagement location; and (ii) selecting the one or more qualified active mobile devices from the set of nearby active mobile devices by identifying the nearby active mobile devices associated with a qualified user account; selecting a qualified active mobile device from the identified one or more qualified active mobile devices for receiving an engagement notification, wherein the selected qualified active mobile device corresponds to the qualified user account with a preferred record; providing the engagement notification to the selected qualified active mobile device; and detecting a reply from the selected qualified active mobile device via the second data communication socket.

In some embodiments, identifying the nearby active mobile devices associated with the qualified user account includes: determining an account type associated with each user account corresponding to each nearby active mobile devices of the set of nearby active mobile devices, wherein the account type includes a qualified account type and an unqualified account type.

In some embodiments, the qualified account type is assigned to a user account qualified to offer a set of products.

In some embodiments, selecting the qualified active mobile device from the identified one or more qualified active mobile devices for receiving the engagement notification includes: determining a performance record associated with each user account corresponding to the identified one or more qualified active mobile devices, wherein the preferred record includes the performance record with a highest sales record.

In some embodiments, detecting the reply from the selected qualified active mobile device via the second data communication socket includes: receiving the reply from the selected qualified active mobile device; and in response to an acceptance of the engagement, transmitting at least a portion of the engagement information to the selected qualified active mobile device, and in response to a decline of the engagement, selecting a subsequent qualified active mobile device from the identified one or more qualified active mobile devices to receive the engagement notification.

In some embodiments, selecting the subsequent qualified active mobile device from the identified one or more qualified active mobile devices to receive the engagement notification includes: selecting a qualified active mobile device from the identified one or more qualified active mobile devices that corresponds to the qualified user with a next highest sales record.

In some embodiments, detecting the reply from the selected qualified active mobile device via the second data communication socket includes: determining whether the reply is received within a notification period; and in response to determining the reply is received within the notification period, generating an engagement confirmation notification to the selected qualified active mobile device, otherwise, selecting a subsequent qualified active mobile device from the identified one or more qualified active mobile devices to receive the engagement notification.

In accordance with an embodiment, there is provided a system for communicating an engagement to a plurality of active mobile devices. Each active mobile device is associated with an active user. The system includes: a communication interface; a non-transitory memory; a computer processor configured to execute instructions stored in the non-transitory memory to: establish, at the communication interface, at least one data communication socket for each active mobile device, wherein the at least one data communication socket includes a location data communication socket and a secondary data communication socket; receive, at the communication interface, a plurality of location data streams, wherein each location data stream includes location data corresponding to a physical location of each active mobile device, and wherein the location data is communicated via the location data communication socket; receive, at the communication interface, engagement information includes at least an engagement location; in response to receiving the engagement information, identify one or more qualified active mobile devices near the engagement location by: (i) detecting a set of nearby active mobile devices, wherein the set of nearby active mobile devices includes one or more active mobile devices within a proximity threshold of the engagement location; and (ii) selecting the one or more qualified active mobile devices from the set of nearby active mobile devices by identifying the nearby active mobile devices associated with a qualified user account; select a qualified active mobile device from the identified one or more qualified active mobile devices for receiving an engagement notification, wherein the qualified active mobile device corresponds to the qualified user account with a preferred record; provide the engagement notification to the selected qualified active mobile device; and detect a reply from the selected qualified active mobile device via the second data communication socket.

In accordance with an embodiment, there is provided a method of communicating an engagement to a plurality of active mobile devices. Each active mobile device is associated with an active user. The method includes: providing at least one data communication socket for each active mobile device in the plurality of active mobile devices; identifying one or more qualified active mobile devices, each qualified active mobile device being associated with a qualified user account; selecting a qualified active mobile device from the identified one or more qualified active mobile devices for receiving an engagement notification, wherein the qualified active mobile device corresponds to the qualified user account with a preferred record; providing the engagement notification to the selected qualified active mobile device; and detecting a reply from the selected qualified active mobile device via the at least one data communication socket.

In some embodiments, the qualified user account includes a user account qualified to offer a set of products.

In some embodiments, selecting the qualified active mobile device from the identified one or more qualified active mobile devices for receiving the engagement notification includes: determining a performance record associated with each user account corresponding to the identified one or more qualified active mobile devices, wherein the preferred record includes the performance record with a highest sales record.

In some embodiments, detecting the reply from the selected qualified active mobile device via the second data communication socket includes: receiving the reply from the selected qualified active mobile device; and in response to an acceptance of the engagement, transmitting at least a portion of the engagement information to the selected qualified active mobile device, and in response to a decline of the engagement, selecting a subsequent qualified active mobile device from the identified one or more qualified active mobile devices to receive the engagement notification.

In some embodiments, selecting the subsequent qualified active mobile device from the identified one or more qualified active mobile devices to receive the engagement notification includes: selecting a qualified active mobile device from the identified one or more qualified active mobile devices that corresponds to the preferred user with a subsequent preferred record.

In some embodiments, detecting the reply from the selected qualified active mobile device via the second data communication socket includes: determining whether the reply is received within a notification period; and in response to determining the reply is received within the notification period, generating an engagement confirmation notification to the selected qualified active mobile device, otherwise, selecting a subsequent qualified active mobile device from the identified one or more qualified active mobile devices to receive the engagement notification.

In accordance with an embodiment, there is provided a system for communicating an engagement to a plurality of active mobile devices. Each active mobile device is associated with an active user. The system includes: a communication interface; a non-transitory memory; a computer processor configured to execute instructions stored in the non-transitory memory to: provide, at the communication interface, at least one data communication socket for each active mobile device in the plurality of active mobile devices; identify one or more qualified active mobile devices, each qualified active mobile device being associated with a qualified user account; select a qualified active mobile device from the identified one or more qualified active mobile devices for receiving an engagement notification, wherein the qualified active mobile device corresponds to the qualified user account with a preferred record; provide the engagement notification to the selected qualified active mobile device; and detect a reply from the selected qualified active mobile device via the at least one data communication socket.

In some embodiments, the qualified user account includes a user account qualified to offer a set of products.

In some embodiments, the computer processor is configured to: determine a performance record associated with each user account corresponding to the identified one or more qualified active mobile devices, wherein the preferred record includes the performance record with a highest sales record.

In some embodiments, the computer processor is configured to: receive the reply from the selected qualified active mobile device; and in response to an acceptance of the engagement, transmit at least a portion of the engagement information to the selected qualified active mobile device, and in response to a decline of the engagement, select a subsequent qualified active mobile device from the identified one or more qualified active mobile devices to receive the engagement notification.

In some embodiments, the computer processor is configured to: select a qualified active mobile device from the identified one or more qualified active mobile devices that corresponds to the preferred user with a subsequent preferred record.

In some embodiments, the computer processor is configured to: determine whether the reply is received within a notification period; and in response to determining the reply is received within the notification period, generate an engagement confirmation notification to the selected qualified active mobile device, otherwise, select a subsequent qualified active mobile device from the identified one or more qualified active mobile devices to receive the engagement notification.

BRIEF DESCRIPTION OF THE DRAWINGS

Several embodiments will now be described in detail with reference to the drawings, in which.

Figure 1:
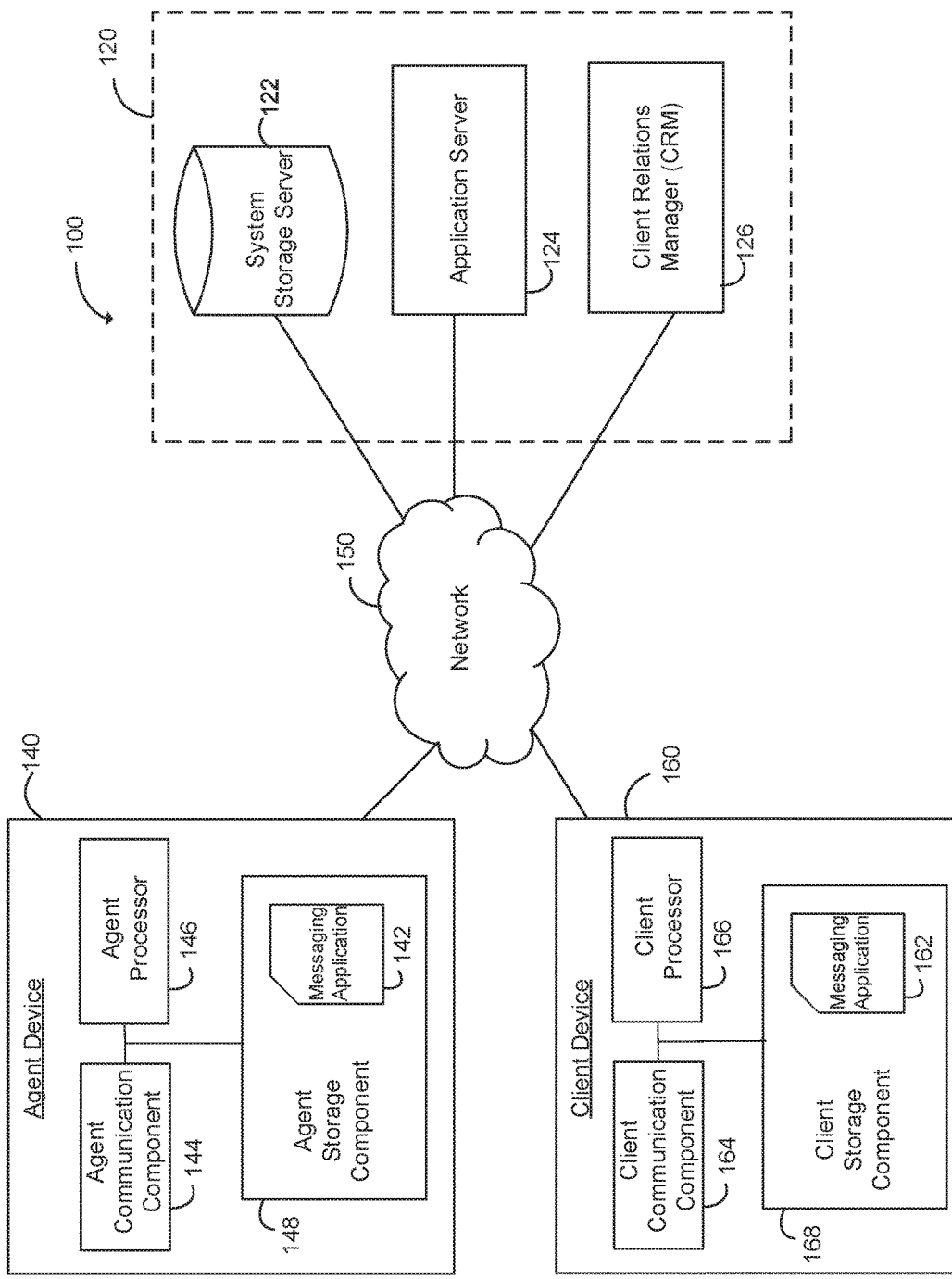
FIG. 1 is a block diagram of components interacting with an example messaging system in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

The embodiments described herein relate to methods and systems for communicating information related to an engagement request to users of mobile devices. The users of the mobile devices can be geographically remote from each other, such as in different areas within a city, state or province, or in different countries.

An engagement request can include a request for a meeting between an agent and a client. The meeting can include any form of interaction between the agent and the client, such as via phone, text chat, email, video chat, face-to-face and/or other similar form of communication. The purpose of the meeting may include but is not limited to sharing of information, a discussion related to a purchase/sale of a product and/or service, or an estimation of fees related to a product and/or service. For example, the engagement can first involve an agent reviewing photo of a plumbing issue received from a client and providing a cost estimate potential, and subsequently attending to the problem on-site.

The term "client" refers to the party requesting the service, product and/or information and the term "agent" refers to the party providing the service, product and/or information. For example, the agent can be a representative of an insurance broker and the client is a consumer interested in purchasing insurance. An engagement can include a face-to-face meeting between the insurance agent and the client to discuss the insurance policies that may be available. For the client, the discussion may result in the agent selling the client one or more insurance products, or alternatively, the client obtaining useful information for additional analysis and decision making. In other examples, the engagement can involve providing a service by an agent who is a service provider such as a plumber, locksmith, electrician or contractor.

A person seeking services or product information can seek an agent through directories such as the local YellowPages® directory, local classifieds or through an Internet query. From the directories, a number of agents can be identified and the person can then contact the agent to seek more information. The agent(s) contacted can be busy, or may not be qualified to provide the information or services desired. When setting up an engagement, several rounds of correspondence may be required, which can delay setting up the engagement. The process may be delayed further if any of the correspondences are erroneously redirected correspondence into the "spam" or "junk" folder of the email inbox. The process for setting up an engagement can be cumbersome and lengthy, and even when an engagement is set up, the agent may not be available immediately or anytime soon.

From a client's perspective, it is typically desirable to obtain the services and/or products as soon as possible, particularly if the matter is urgent (e.g. a flooded basement). From an agent's perspective, meeting with a potential client as soon as possible will increase the likelihood of the transaction, especially if the agent is able to become involved in the decision-making process at the early stages. To facilitate the engagement process, the described methods and systems apply at least location detection technologies and low-latency communication to distribute leads efficiently via mobile devices, and to enable nearly immediate response from the agents to the lead. Distribution of leads with the methods and systems described herein can significantly reduce the time between an initial engagement request and increase the likelihood of an engagement between the agent and the potential client.

Although the examples described herein are in the context of providing insurance, the methods and systems described herein can be applied to other areas and are not limited to the insurance industry.

Referring now to FIG. 1, shown therein is a block diagram 100 of an example messaging system 120 interacting with an agent device 140 and a client device 160 via a network 150. Although only one agent device 140 and one client device 160 are shown, more agent devices 140 and client devices 160 can engage with the messaging system 120 at any one time.

The network 150 can include any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling electronic communication between the messaging system 120, the agent device 140, and the client device 160.

The agent device 140 and the client device 160 can be any device capable of communicating with other devices via the network 150. For example, and without limitation, the agent device 140 and the client device 160 can include a personal computer, laptop, personal data assistant, cellular telephone, smart-phone device, tablet computer, and/or other wireless device. The agent device 140 includes an agent communication component 144, an agent processor 146 and an agent storage component 148, and the client device 160 includes a client communication component 164, a client processor 166 and a client storage component 168.

The agent and client communication components 144 and 164 are analogous components with similar functionality. The communication components 144 and 164 can operate to enable communication via the network 150 via serial, parallel, Bluetooth, WiFi, cellular (EDGE, 3G, 4G, HSPA, or LTE) and USB connections. The communication components 144 and 164 can operate based on various communication protocols including, but not limited to, TCP, UDP, HTTP, HTTPS and UDP.

In some embodiments, the communication components 144 and 164 can be configured to access resources that provide location services and location data, including GPS, Assisted GPS, GLONASS, Cell Tower ID, Wi-Fi positioning system and the like. The ability of the communication components 144 and 164 to access location services and location data may be useful for agent devices 140 that move between engagements from one location to another over time. Location data may be provided to the messaging system 120 on a regular basis to keep the messaging system 120 updated with respect to the whereabouts of the agent devices 140 to generate notifications to agent devices 140 geographically near the client devices 160.

In some embodiments, a low latency communication link can be established between the agent devices 140, the client devices 160 and the messaging system 120 via the network 150. For example, the communication link can be established with a WebSocket protocol over a TCP/IP connection. The WebSocket protocol, which is defined within the HTML5 specification, may be used to provide a full-duplex, bi-directional communication channel over a conventional HTTP connection via an upgrade protocol between an HTML5-compliant application (i.e. software client) and an HTML5-compliant server. To enhance security, the WebSocket communication channel may be encrypted.

Once a WebSocket channel is established, data frames (text or binary) may be sent back and forth between the messaging application 142, 162 and the messaging system 120 in full-duplex mode. For example, location data may be streamed continuously from the agent device 140 to the messaging system 120 using a first WebSocket channel and other types of data may be transmitted between the messaging system 120 and the agent device 140 using a second WebSocket channel.

The agent and client processors 146 and 166 are analogous components with similar functionality. The processors 146, 166 can include any suitable controllers or digital signal processors that can provide sufficient processing power depending on the configuration, purposes and requirements of the agent device 140 and client device 160. In some embodiments, the processors 146, 166 can include more than one processor with each processor being configured to perform different dedicated tasks.

The agent and client storage component 148 are analogous components with similar functionality. As shown in FIG. 1, each of the storage components 148, 168 includes a messaging application 142, 162 executable by the processors 146, 166 to operate with the messaging system 120. For example, the messaging application 142 can operate to receive notifications from the messaging system 120 regarding potential engagements via the agent communication component 144.

In some embodiments, the storage components 148, 168 can store user-specific data such as login-credentials to access the messaging system 120. In some embodiments, the storage component 148 can store notifications related to potential engagements that can be reviewed by the agent of the agent device 140 immediately or later on.

The messaging system 120 includes a system storage server 122, an application server 124 and a client relations manager 126.

The system storage server 122, the application server and the client relations manager 126 can be provided on one or more computer servers that include one or more processors with computing processing abilities and memory such as a database(s) or file system(s). Also, the system storage server 122, the application server and the client relations manager 126 can be distributed over a wide geographic area and connected via the network 150.

For example, the messaging system 120 can be operated by an insurance broker to receive inquiries from potential clients and to provide notifications to agents regarding potential engagements. Client inquiries made to the broker for information regarding insurance products may be provided to the client relations manager 126 so that a record of the interaction may be made. Client information provided to the client relations manager 126 may then be stored in the system storage server 122. The application server 124 may be used to coordinate the flow of data provided to the client relations manager 126 and the system storage server 122. The application server 124 may coordinate the flow of data and provide communication between the agent device 140 and the messaging system 120, or between the client device 160, the messaging system 120 and other devices.

In some embodiments, the client device 160 may be operated by a client to interact with an insurance broker via the messaging system 120. For example, a client can operate the client device 160 to conduct research on an insurance product. The research can involve a query on one or more Internet search engines, such as Google™, Yahoo!™ or Microsoft™. The search results may include a link directing the client to a webpage operated by the insurance broker designed to provide information related to insurance products and services offered by that broker.

The webpage can be hosted by the messaging system 120, such as the application server 124 or the client relations manager 126. The messaging system 120 can receive input via the webpage, for example, to collect information from the potential client in respect of the insurance product. For example, the messaging system 120 can receive contact information of the potential client, such as a phone number, at which the client can be contacted for setting up an engagement. The potential client and the agent can connect via the respective devices 140 and 160 via voice and/or video initially. In some other embodiments, the client can initiate an engagement with the agent directly via the messaging application 162.

Figure 2:
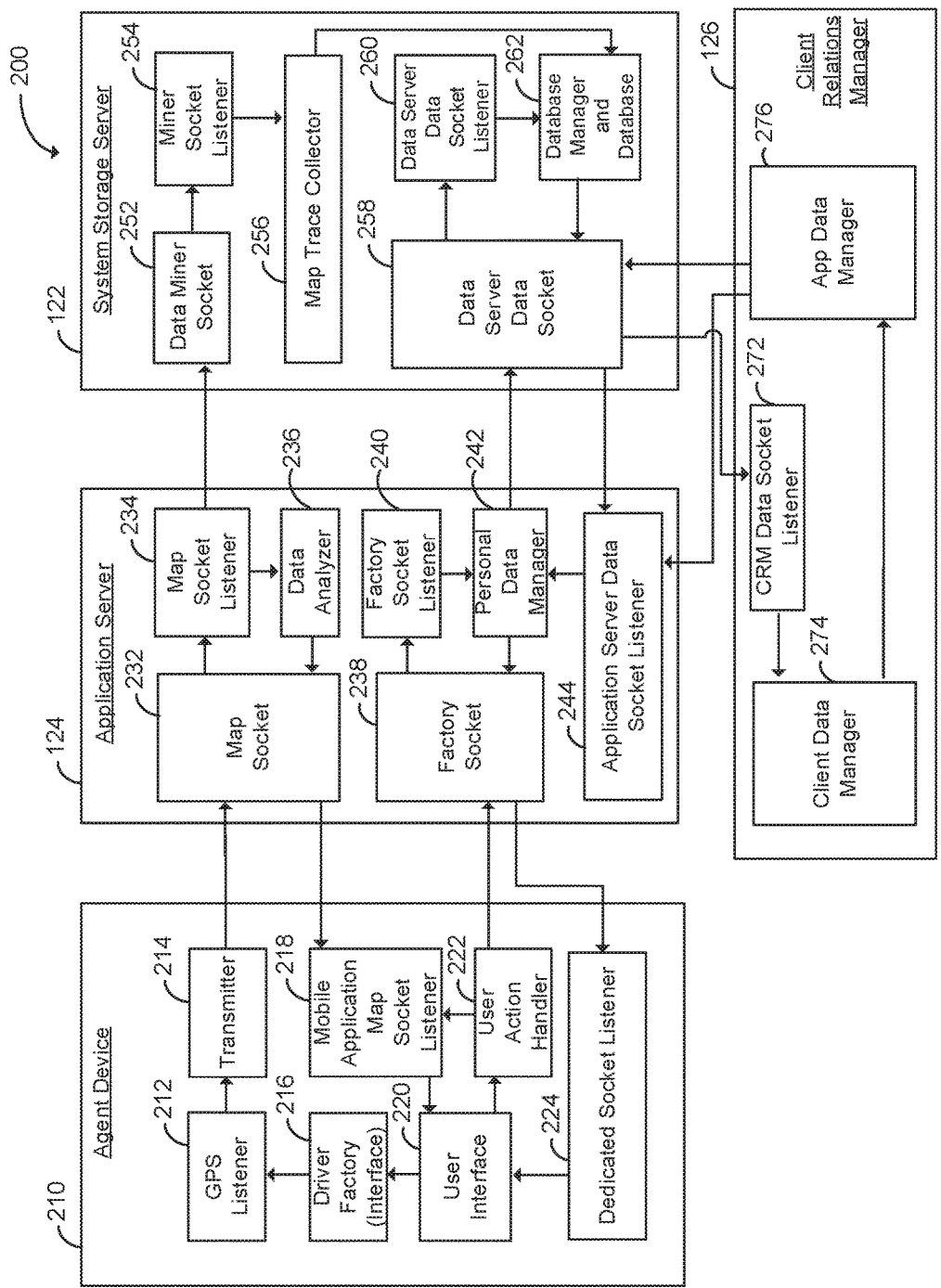
FIG. 2 is an example data flow within the example messaging system shown in FIG. 1.

Reference is now made to FIG. 2, which is a block diagram 200 of an example data flow between an example agent device 210 installed with the messaging application 142 and the messaging system 120 for establishing an engagement. The block diagram 200 shows an example implementation of the application server 124, the system storage server 122 and the client relations manager 126.

The application server 124 may process all data received from the agent device 210 and client relations manager 126. For example, the data that is processed may include authentication and location data provided to the agent device 210 and data related to a client collected by the client relations manager 126. The application server 124 may communicate data regarding potential engagements to the appropriate agents.

The agent device 210 is an example embodiment of the agent device 140 of FIG. 1. The agent device 210 operates on an operating system, such as, but not limited to, Android™, Windows™ Phone, or iOS™, to execute the mobile application installed. When the mobile application is executed, the agent device 210 can access local hardware resources via the driver factory 216, for example, and can also communicate with the application server 124 to conduct the functionalities as described herein.

For example, the mobile application may operate to determine a location of the agent device 210 with the GPS listener 212. The GPS listener 212 may access the position detection hardware at the agent device 210 to obtain location and other physical data that may be transmitted to the application server 124 using the transmitter 214. The transmitter 214 may be a software module of the mobile application that uses the agent device's hardware resources to establish a WebSocket link to communicate with the application server 124. In some embodiments, the transmitter 214 may use a dedicated WebSocket link to transmit position information to the application server 124.

The mobile application may include a user interface 220 for displaying information received from the application server 124 and receiving user input. For example, location or map data concerning the location of an engagement may be received via a WebSocket channel by the map socket listener 218 and rendered on the user interface 220. Other information may also be received via another WebSocket channel by the dedicated socket listener 224 and similarly presented on the user interface.

Figure 3:
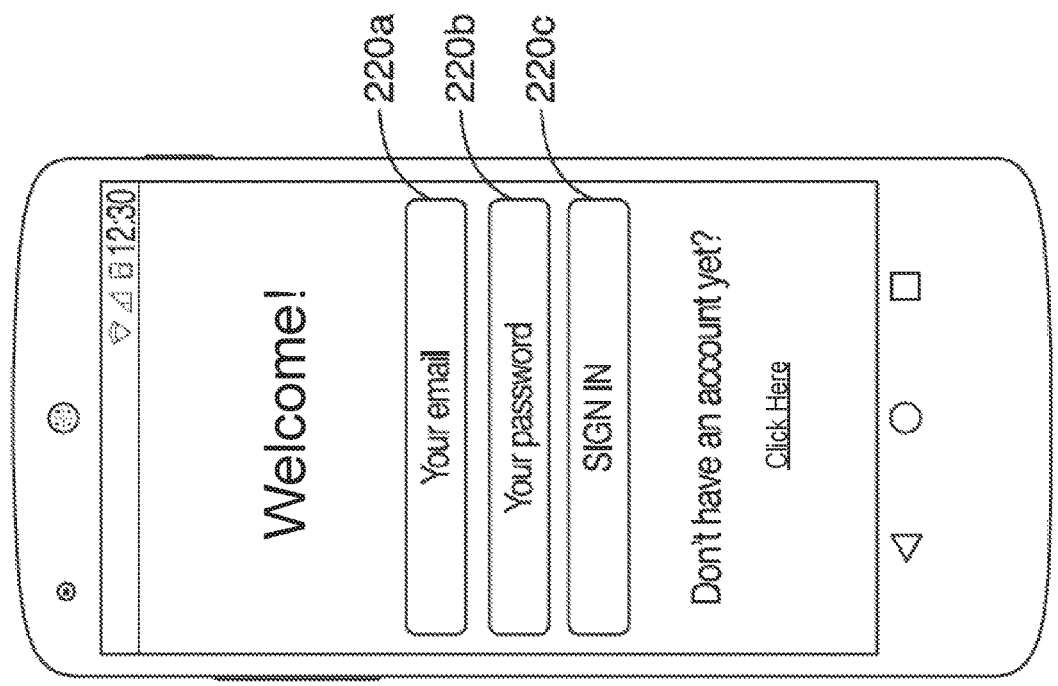
FIG. 3 is a screenshot of an example user interface.

The user action handler 222 may receive user input from the user interface 220. For example, as shown in FIG. 3, when a user accesses the application server 124, the user is first authenticated by the application server 124. FIG. 3 shows an example login interface from which the application server 124 can receive the login information of the user via the user interface 220 of the mobile application. The example login interface can include an email identifier field 220a and a password field 220b. When a submission control 220c on the login interface is selected, the user action handler 222 may then provide the received login information to the application server 124 for authenticating the user operating the agent device 210. If the application server 124 authenticates the user, that agent device 210 is marked as an active agent device and corresponds to an active agent.

The application server 124 may provide the decision-making functions of the messaging system 120 for establishing engagements. The application server 124 may operate on any server environment capable of providing the purposes and configuration of the described messaging system 120. Example server environments include, but are not limited to, Microsoft Windows Server™ or any variant of the Linux™ operating system such as Ubuntu™, FreeBSD™ and CentOS™.

In some embodiments, the mobile application may communicate with the application server 124 via established WebSocket channels. The mobile application may not have direct access to the system storage server 122 and can transmit and receive data from the system storage server 122 via the application server 124. In some embodiments, the mobile application may have direct access to the system storage server 122 for transmitting and receiving data directly.

In some embodiments, the application server 124 may receive location data streams via the map socket listener 234. The location data may be transmitted by the transmitter 214 of the mobile application through a dedicated WebSocket channel, such as the map socket 232. The location data streams can include location data that corresponds to the physical location of the agent device 210 gathered by the GPS listener 212. In some cases, the location data stream may also include timestamps that accompany the location data.

Modifying the transmission frequency of the location data can increase the power efficiency of the battery at the agent device 210 as well as the system resources at the agent device 210 (e.g. processing, memory, etc.), reduce congestion of the long-range communication networks, and reduce the processing burden at the application server 124 (i.e. the application server 124 may have fewer activities). The transmission frequency of the location data can be varied by the user.

The frequency at which the location data is transmitted can be a predefined time intervals (e.g. every 60 seconds) or as triggered by the mobile application. For example, if the mobile application detects that the agent device 210 is in motion, the frequency at which the location data is transmitted may be increased. The frequency may vary with the speed at which the agent device 210 is in motion. For example, the frequency at which the location data is transmitted may be increased to every 5 seconds when the detected motion is at a rate that corresponds to driving (e.g. where the speed is greater than 20 km/h); if the detected motion is at a rate that corresponds to walking (e.g. where the speed is around 5 km/h), the frequency at which the location data is transmitted may be increased to every 15 seconds; and if the agent device 210 is experiencing little to no movement, the frequency at which the location data is transmitted may be maintained at the predefined time interval.

In some embodiments, the frequency at which the location data is transmitted may vary with the communication network that is available to the agent device 210. For example, if the agent device 210 only has access to long-range communication (e.g. cellular, 3G, LTE and the like), the agent device 210 can transmit location data at the predefined time interval but if the agent device 210 has access to short range communication (e.g. Wi-Fi communication), the mobile application may increase the frequency at which the location data is transmitted.

In some embodiments, the frequency at which the location data is transmitted can be decreased if the mobile application detects that the battery of the agent device 210 is below a set threshold.

The location data of the agent device 210 may be sent to the system storage server 122 by the map socket listener 234 for storage. In some embodiments, recent location data received by the application server 124 (and stored in system storage server 122) may be designated as "current" for a specified amount of time (e.g. 90 minutes) so that an agent may still be notified of nearby engagements even if the agent appears offline at the time the engagement became available. For example, the agent device 210 may become temporarily disconnected from the application server 124 due to weak network connectivity or temporarily issues with the network connectivity.

The map socket 232 may be used to transmit mapping data produced by the data analyzer 236 to the mobile application. For example, when an agent is selected to attend an engagement, the data related to the location of the engagement may be sent by the data analyzer 236 via the map socket 232 to the map socket listener 218 of the mobile application. The mapping data may be rendered by the user interface 220 for display to the agent at the agent device 210.

In some embodiments, the application server 124 may also communicate with the agent device 210 through a dedicated WebSocket channel, such as the factory socket 238. The factory socket 238 may be used to send and receive data other than location data, in some embodiments. For example, user inputs received from the user action handler 222 of the mobile application may be transmitted by the user action handler 222 to the factory socket listener 240 via factory socket 238. Data to be provided to the mobile application may be sent by the personal data manager 242 via the factory socket 238 to the dedicated socket listener 224 of the mobile application. In some embodiments, the data obtained by the personal data manager 242 may be obtained from the system storage server 122 through the application server data socket listener 244.

Although FIG. 2 illustrates only one map socket and only one factory socket, the number of sockets available at the application server 124 may increase with the number of active agent devices in communication with the application server 124. For example, the number of location data streams increases with more active agent devices so that more instances of map sockets may be needed. Similarly, more instances of factory sockets may be required to transmit other data.

The system storage server 122 may be used to maintain and store all the information needed to operate the messaging system 120. In some embodiments, the system storage server 122 may be used to store data related to clients (e.g. leads indicating the type of insurance product desired, their location, profile information), engagements, records of prior interactions (e.g. calls and engagements), location data received from the agent devices and agent or user login information.

The system storage server 122 may be in communication with the application server 124 via WebSocket channels. Use of the WebSocket channels can provide rapid and low-latency socket connections, which can reduce operation time related to requesting/receiving data such as business or client information. Location data originating from the agent device 210 may be received from the application server 124 by the miner socket listener 254 through the data miner socket 252. The location data may be processed by the map trace collector 256 so that the data may be saved into the database manager and database 262. In some embodiments, the data may be "mined" or processed to calculate distances between a client and an agent, as well as to determine the movement patterns of agents for the purpose of selecting an agent to participate in an engagement.

Data other than location data may be received from the application server 124 and processed by the data server data socket listener 260 via the data server data socket 258 and saved at the database manager and database 262. Data transmitted to the application server 124 may be sent by the database manager and database 262 through the data server data socket 258. For example, the application server 124 may provide the system storage server 122 with a read request to retrieve information related to an upcoming engagement and distribute this data to the agent chosen to participate in that engagement. Data for the engagement, for example, may be provided to the application server 124 via the data server data socket 258.

The system storage server 122 may be implemented in various manners. For example, the system storage server 122 may be a component of the application server 124. In some embodiments, the system storage server 122 may operate as a separate server within the same data center as the application server 124. In some embodiments, the system storage server 122 may operate remotely from the application server 124 so that the application server 124 may be required to operate an application module to permit the data stored on the system storage server 122 to appear as a local network resource. In some embodiments, the system storage server 122 may be implemented with cloud storage technologies in which access to the stored data may be facilitated via calls to an Application Programming Interface (API) specific for the cloud storage resource.

The client relations manager 126 may be used for tracking client interactions by the insurance broker and for performing tasks such as data collection related to existing and potential clients, client data analysis and analytics, report generation and generation of potential leads for engagements. The client relations manager 126 may be operated with the application server 124 to provide a system to automate sales, marketing and customer support. For example, client information collected through the client relations manager 126 may be processed by the client data manager 274 to generate client data and passed onto the application server 124 via the app data updater 276. The client relations manager may also provide or push information corresponding to possible leads for potential engagements to the application server 124 for dissemination to the agent devices.

Communication between the client relations manager 126 and the application server 124 may be established using WebSocket channels for bidirectional and low-latency connections. For example, the app data updater 276 may transmit client data to the application server 124 through the application server data socket listener 244. The client relations manager 126 may retrieve data stored in the system storage server 122 for processing or presentation via the application server 124. For example, the app data updater 276 may issue a data request to the application server 124, the request may be received by the personal data manager 242 (via the application server data socket listener 244) which instructs the database manager and database 262 (via the data server data socket 258 and data server data socket listener 260) to provide the requested data to the client relations manager 126, received by the data socket listener 272 via the data server data socket 258.

The client relations manager 126 may provide a number of interfaces specific to different classes of users for the collection of client information. For example, the client relations manager 126 may provide a call center interface which allows call center agents to enter client information as the call center agent speaks to a client on the phone. Such an interface may be configured for internal use, and may be accessible within the insurance broker's call center via internal network access. In some cases, the call center interface of client relations manager 126 may be provided using a web-accessible interface such that any compatible web-browser may be used to access the client relations manager. In other cases, the client relations manager interface may be application-based which uses a specific executable program to access the client relations manager 126. Leads for potential engagements may be generated based on the information entered into the client relations manager 126 by the agents during a call with a client. For example, the lead information may be generated and sent to nearby agents (i.e. as a notification or alert) as soon as sufficient information is collected by the call center agent (e.g. the client's location or address), even while a call center agent is still on the phone with the client.

The client relations manager 126 may also provide an external interface such as a publicly accessible web landing page or a homepage with content related to insurance products. For example, a consumer searching for insurance products may land on the landing page provided by the client relations manager 126. In some embodiments, the publicly accessible webpage may be linked to the client relations manager 126 through a secure communication channel to ensure data exchanged between the visitor and the client relations manager 126 is secure.

The client relations manager 126 may also feature a quote estimator function to allow a visitor to determine the possible premiums for a particular type of insurance coverage based on information provided by the visitor (now a potential client). As such, the public interface of the client relations manager 126 may be configured to accept client input through an input form. The input form may include requests for information such as gender, age, known current medical conditions and current medications. In some embodiments, the input form may further ask the client for their contact information so that a call center representative may follow up with their query. In some embodiments, the visitor may set up an appointment with an agent to discuss insurance options in an engagement.

Figure 4:
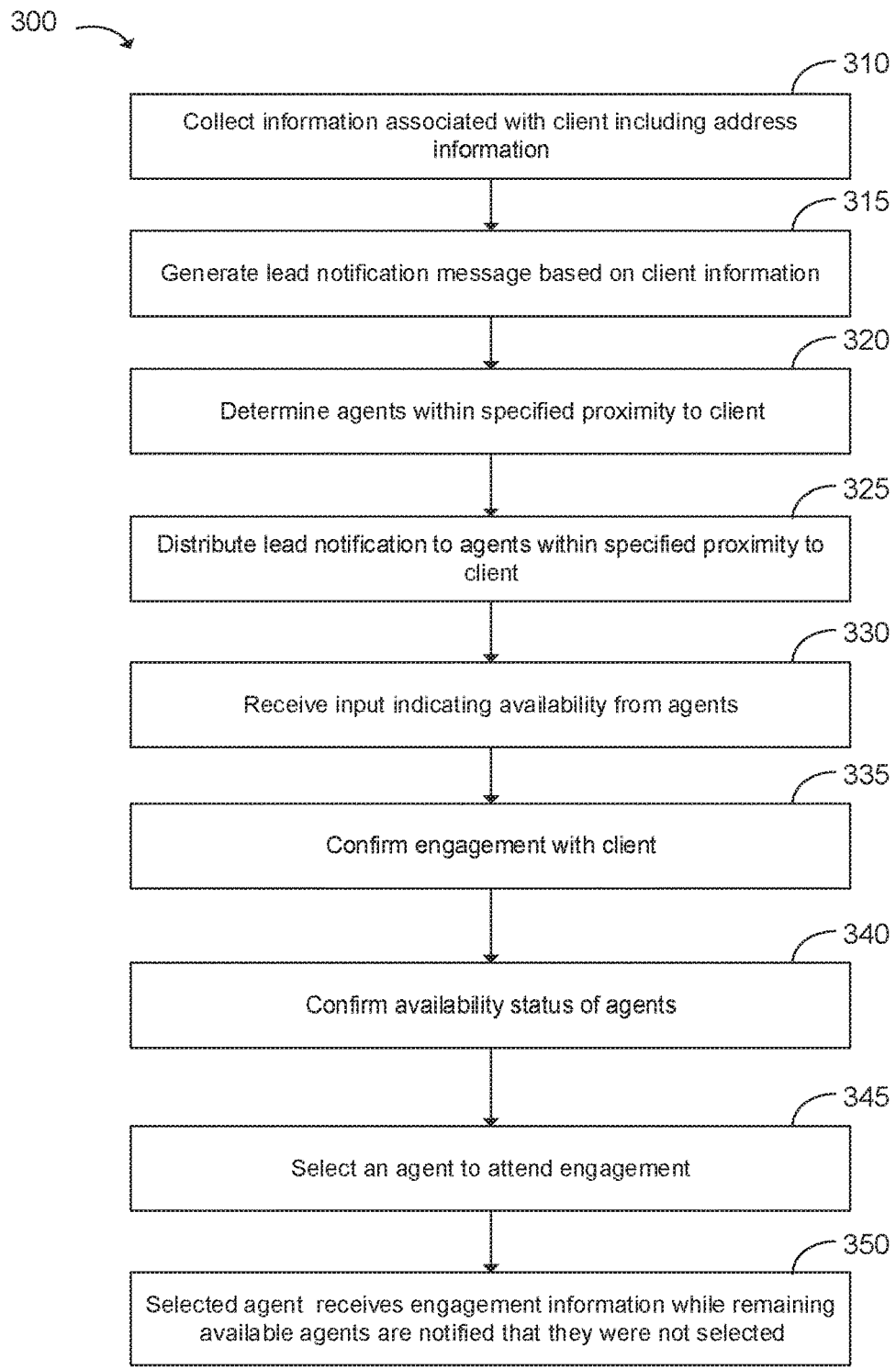
FIG. 4 is a flowchart of an example method of communicating an engagement in accordance with an example embodiment.

FIG. 4 is a flowchart of an example method 300 for establishing an engagement. Reference will be made simultaneously to FIGS. 2 and 5A to 5E for illustrating the method 300 in FIG. 4.

In some embodiments, the method 300 may be performed by the application server 124. In some embodiments, different system components may operate cooperatively to execute the method 300.

At 310, information regarding a potential client, including address information, may be collected. The potential client may be in contact with the insurance broker in a number of ways. For example, the potential client may call the broker's call center to speak with a call center agent. In other cases, the call center agent may initiate a follow up call having received contact information via the front facing portion of the client relations manager 126, for example, via an input form for requesting insurance quotes. In some cases, the information may be collected directly by the client relations manager 126 via an online form without involving the call center call center.

The information collected may include the client's age, gender, the type of insurance the client is looking for as well as their address information. The collected information may then be used to generate leads upon which engagements between an insurance agent and the client can be arranged. Having obtained the address information and the insurance product of interest, the client relations manager 126 may provide this lead information to the application server 124 for further processing.

At 315, the application server 124 can generate a lead notification message based on the client information received from the client relations manager 126. A lead notification message may be generated for distribution as soon as the location of the client is determined and provided to the application server 124. In some cases, the client relations manager 126 may generate the lead notification message, which is provided to the application server 124 for distribution.

At 320, when the lead notification message is ready to be distributed, the application server 124 may proceed to identify one or more active agent devices near the location of the client. Nearby agents may be identified based on the location information transmitted by their associated agent devices to the application server 124. Each agent device 140 can transmit a location data stream via a WebSocket channel to the application server 124 so that the location data may be used to identify the proximity between the active agent device 140 and the potential client.

Depending on the usage of the messaging system 120, different proximity thresholds may be set. Within the insurance context, for example, the insurance broker may define the proximity threshold between an active agent and a potential client that falls within a nearby parameter. For example, proximity may be determined based on travel time or actual distance. In some cases, proximity may be defined by a geometrical shape with its center corresponding to the location of the potential client. For example, a square with its center set at the location of the potential client can be defined and any active agent devices whose current location falls within the square may be considered a nearby agent. The size of the square may be varied depending on the location of the potential client. For example, a smaller square may be defined in densely populated or urban areas, while a larger square may be used for less populated or rural areas. In other cases, the area considered may be defined by other shapes that may be more preferable such as a circle or rectangle.

In some embodiments, the locations of the active agent devices 140 may be retained in the system storage server 122 for a defined period of time (e.g. for 90 minutes or other time periods) before it is no longer regarded as current. It is possible that even if the active agent device 140 has moved beyond a designated area, that active agent device 140 may still be regarded as a nearby agent.

At 325, having identified one or more nearby agents, lead notification messages may be distributed to these nearby agents. The lead notification message may include a unique recipient identifier, information corresponding to the type of insurance the client is looking for and the approximate distance. The lead notification messages may be concurrently distributed to the nearby agents so that the nearby agent devices 140 can receive the notifications at substantially the same time, with minimal delay between each recipient receiving their respective notification. For example, the recipients of the notifications may be high-performing as well as average- or low-performing agents. If a less experienced or low-performing agent is notified first and responds first, that agent may end up being selected to participate in an engagement over a more experienced or higher-performing agent because there was a delay in latter agent receiving a notification. The likelihood of a successful sale may be reduced as a result of the low-performing agent's experience level.

In some embodiments, the application server 124 may execute or spawn multiple system processes for the purpose of generating and distributing lead notification messages to facilitate concurrent reception. For example, the number of processes spawned may be equal to the number of nearby agents set to receive the lead notification messages. In doing so, each process may be responsible for distributing one lead notification message to minimize processing delays. In some embodiments, the distribution of lead notification messages may utilize a dedicated lead notification distribution system to distribute the lead notification messages. This system may be optimized to communicate with the agent devices in a way that maximizes the likelihood of concurrent reception. For example, the dedicated lead notification system may be operated by a third party provider with capabilities and infrastructure to facilitate cross-platform (e.g. iOS and Android) concurrent delivery.

The application server 124 may spawn processes to generate the lead notification and access the lead notification system using various implementations, such as web-based API calls to schedule the notifications. For example, each process launched by the application server 124 may execute an API call to the lead notification system. The notifications transferred to the lead notification distribution system may be forwarded to the nearby agent devices based on the unique recipient identifier. In other embodiments, a dedicated lead notification system may not be used. For example, the message distribution process may use an existing Web-Socket channel established between an agent device 210 and the application server 124 to distribute the notification. In other embodiments, the process may send the lead notification using a new WebSocket channel.

Figure 5B:
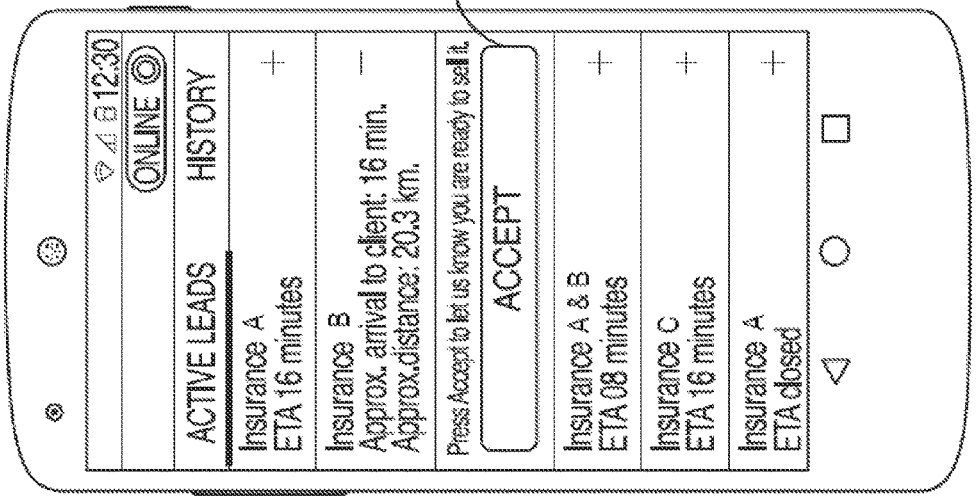
FIG. 5B shows the user interface of FIG. 5A at a subsequent point during the method of FIG. 4.
Figure 5A:
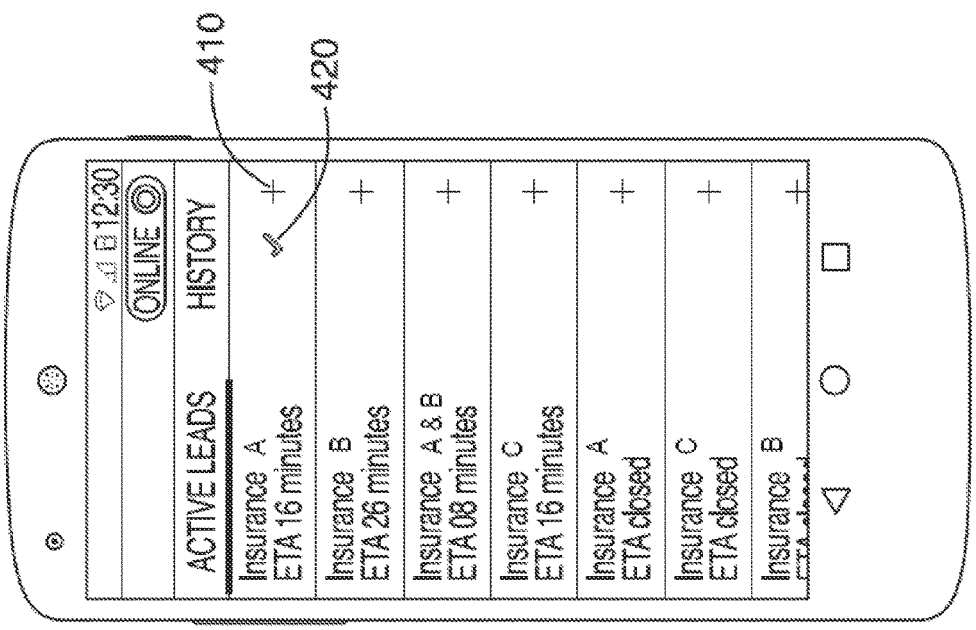
FIG. 5A is a screenshot of an example user interface during an example operation of the method of FIG. 4 in accordance with an example embodiment.

On the active agent's device 140, the notification may be displayed on the user interface 220 of the agent device 210. For example, as shown in FIG. 5A, the lead notification may appear on the agent device 140 screen indicating the type of insurance a client is looking for as well as the estimated travel time to the client for an engagement. Depending on the location of an agent, that agent may be considered a nearby agent for a number of possible engagements. As such, an agent may receive multiple lead notifications as shown in FIG. 5A. Also shown in FIG. 5A is that the notification may be expanded, by tapping on the expansion control 410 of the lead notification. FIG. 5B shows an expanded lead notification, which provides additional information such as the actual distance to the client's location.

At 330, the application server 124 may receive a response corresponding to an input by the agent which indicates whether or not an active agent who received the lead notification message is available to participate in an engagement. The agent may respond to the lead notification message by activating an input control on the user interface 220 to indicate that the agent is available to sell the particular insurance product listed in the lead notification message. Activating the input control can be referred to as submitting a "vote" from the active agent indicating to the application server 124 that the active agent wishes to be considered for the engagement. Upon activating the input control on the user interface 220, the user action handler 222 may process the action and transmit the response to the personal data manager 242 of the application server 124 via the factory socket 238. In circumstances where an active agent is presented with multiple lead notifications, that agent may submit a vote for more than one lead notification.

In some embodiments, the lead notification may remain open for votes and subsequently close (i.e. no longer accept responses) when an engagement has been confirmed with the potential client. An engagement may be confirmed during an interaction between a call center agent and a potential client if, for instance, the call center agent informs the potential client that agents are available to meet the client within the next 60 minutes and the potential client agrees to meet an agent for further discussion. The call center agent may then confirm the time of the engagement upon which time the lead may close.

At 335, confirmation of the engagement may cause the lead notification to close, so that the application server 124 may stop accepting votes for that lead. If an agent did not respond to the lead notification by the time the lead closes, then that particular agent may be deemed not to have voted. In some embodiments, the lead notification may indicate a time limit for providing a response. If the time to respond has lapsed and the agent did not respond, then that agent may similarly be deemed not to have voted.

At 340, when an engagement is confirmed, a notification to confirm the nearby agents' availability may be sent by the application server 124 to all the nearby agents that have previously voted for the lead. The nearby agents that voted may be presented with another input control such as an "Accept" control 430 on the user interface 220 (as shown in FIG. 5B) and/or a "Decline" control (not shown). Activating the "Accept" control may indicate to the application server 124 that the agent is ready and willing to participate in the engagement if selected. Activating the "Decline" control may be used to indicate to the application server 124 that the agent is no longer available for the engagement.

Figure 5D:
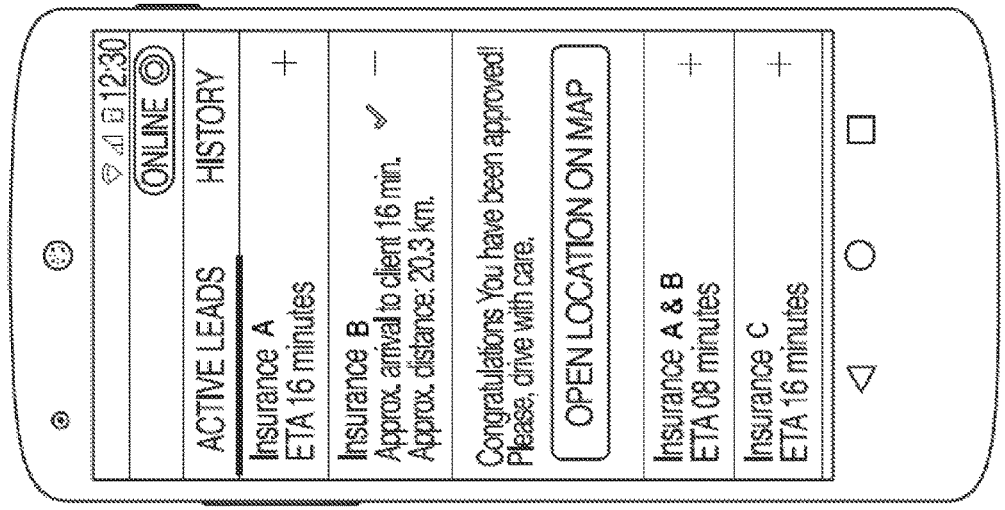
FIG. 5D shows the user interface of FIG. 5C at a subsequent point during the method of FIG. 4.
Figure 5C:
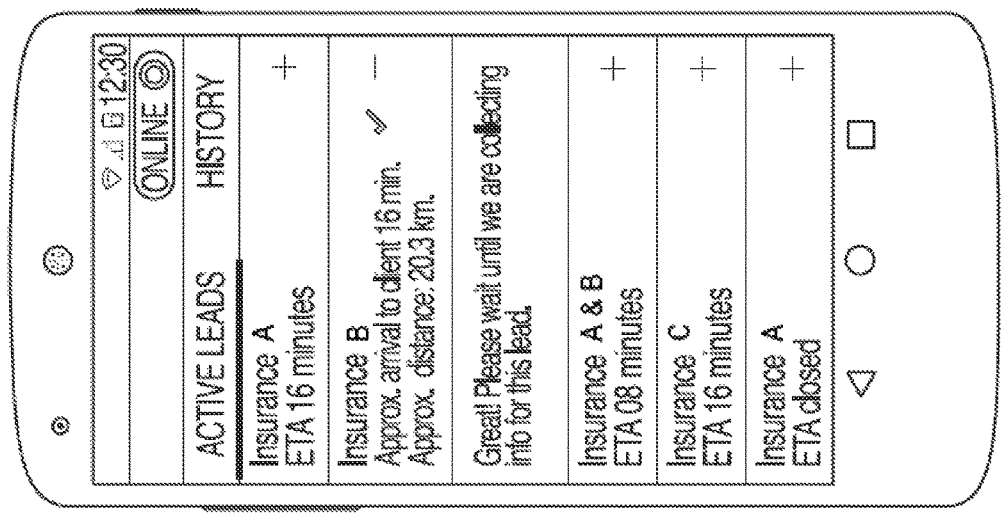
FIG. 5C shows the user interface of FIG. 5B at a subsequent point during the method of FIG. 4.

The input received via the input control may be received by the user action handler 222 which then transmits the response to the personal data manager 242 of the application server 124 via the factory socket 238. Upon the agent confirming a lead notification (e.g., by activating the "Accept" control 430), the user interface 220 of the mobile application may be updated to indicate to the agent to wait for a confirmation, if any, that the agent has been selected to meet with the client as shown in FIG. 5C. A checkmark 420 may be displayed next to the lead notification to indicate that the lead has been accepted (i.e. available to take the lead), for example, as shown in FIG. 5C. In some embodiments, a time limit may be imposed for which an agent may "Accept" or "Decline" their availability. For example, if an agent fails to respond, the application server 124 may deem that agent to have selected "Decline".

The application server 124 may use the confirmations provided by the nearby agents as an indication that the agent is ready, available and committed to attend the engagement if one of those agents were selected to meet with the client. As such, no further input to confirm may be required. Accordingly, an agent may only be permitted to confirm availability for one lead at a time, unlike the agent's ability to vote for multiple leads. In other words, once an agent has confirmed his or her availability for a particular lead, the "Accept" controls corresponding to other leads may be disabled by the user interface 220 of the mobile application 210a until an agent has been selected for that lead.

At 345, a nearby active agent that may be selected to attend the engagement and meet with the client. Different methods of selecting an active agent can be used. For example, each agent may be given a score derived based on various factors including, but not limited to, feedback from clients on past engagements, the success rate of the agent in securing a sale and expertise in the type of insurance being sold. Also, ranking of active agents may be produced from which the highest ranked agent may be selected.

At 350, a nearby active agent may be selected to attend the engagement. Subsequently, a notification specifically for the selected agent may be provided as shown in FIG. 5D, the notification containing details of the engagement, including the time and location. The agents that were not selected may also be provided a notification indicating that they were not selected for the engagement and may resume voting or confirming their availability for other potential engagements. Data related to the confirmed engagement such as the time and location may be saved to a confirmed engagement list on the system storage server 122. The confirmed engagement list may also record various parameters related to the engagement for later analysis. For example, for each appointment, information regarding the agent's travel time, duration of the engagement, the agent's arrival time (i.e. whether he/she was late or early), and whether the engagement was an instant engagement (e.g. an engagement set up between a client and an available agent) or a scheduled engagement (e.g. the client may have a specific agent in mind and has scheduled an engagement ahead of time).

In some embodiments, the application server 124 may request the selected agent to acknowledge that they have been selected prior to receiving details regarding the engagement. This may be useful in situations where the agent was previously within the defined area that is considered near the client but has since traveled outside of that defined area. The notification requesting acknowledgement may have a time limit imposed such that upon expiration of that time limit, a second agent in the list of agents that have voted may be selected and notified instead. If the second agent acknowledges being selected, then 350 may be performed.

Figure 5E:
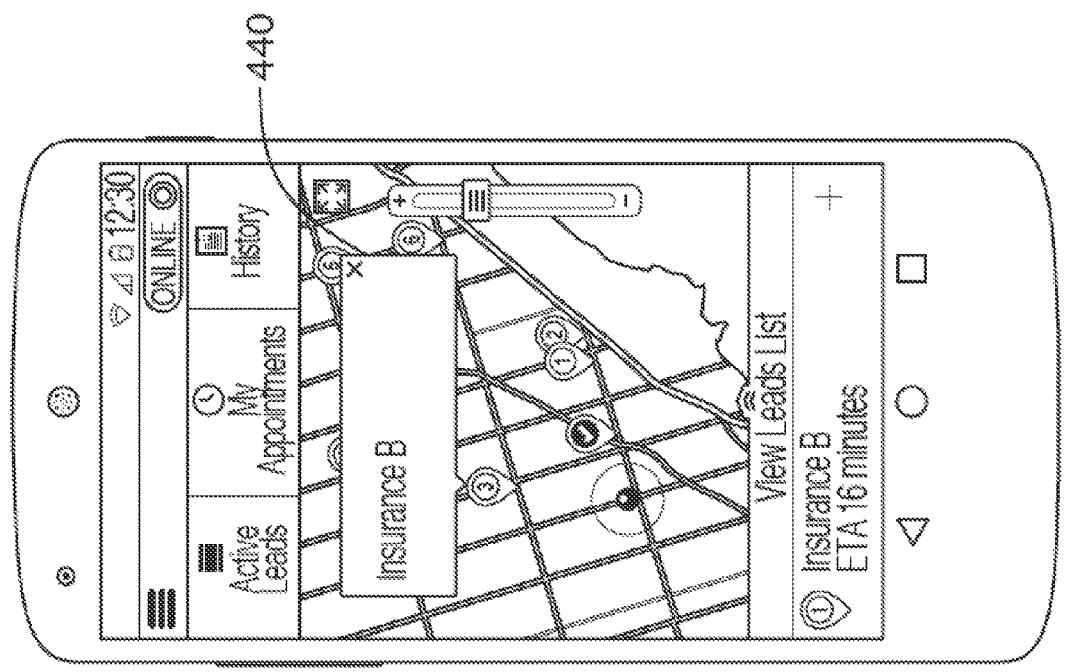
FIG. 5E shows a screenshot of an example user interface during the method of FIG. 4 in accordance with an example embodiment.

As shown in FIGS. 5D and 5E, the notification sent to the selected agent may also include mapping data that the agent may access by interacting with the user interface 220. The mapping data may be used to plot on a map on the user interface 220 of the agent device 210 to indicate the location of the confirmed engagement including the exact address displayed in a text box 440, as shown in FIG. 5E. In some embodiments, the mobile application may be configured to access external information resources for providing enhanced features such as driving directions and traffic data.

Figures 6, 7:
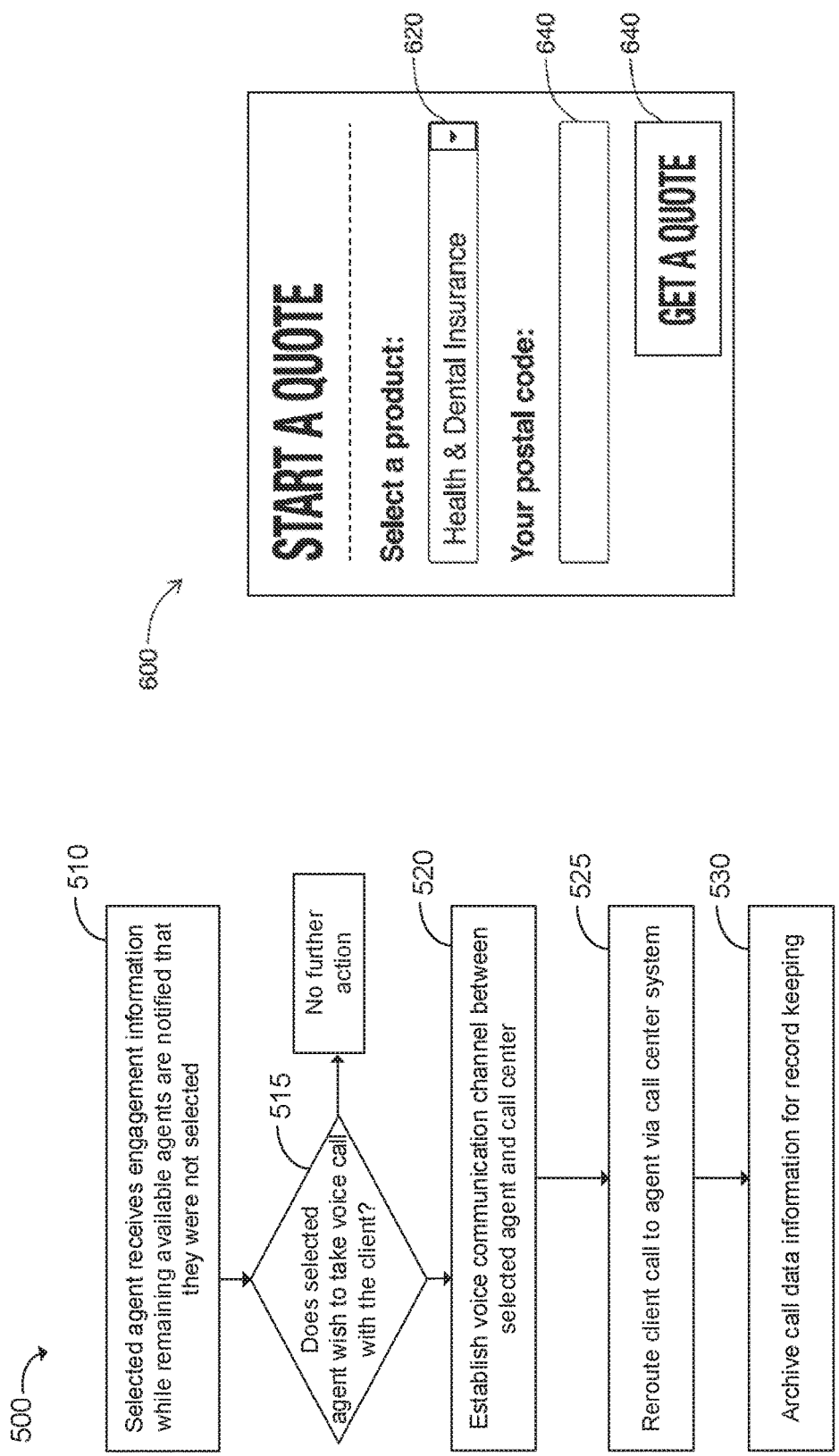
FIG. 6 is a flowchart of an example method for establishing voice communication in accordance with an example embodiment.
FIG. 7 is an example user interface for receiving data for a self-directed engagement in accordance with an example embodiment.

Referring now to FIG. 6, which shows a flowchart of an example method 500 for establishing voice communication after an agent is selected.

Method 500 can continue from the method 300 of FIG. 4. Steps 350 and 510 are analogous. Method 500 can facilitate direct communication with the client to enable a better client-agent relationship to be formed prior to the engagement and would allow the client, if desired, to modify details of the engagement, such as the meeting location.

At 510, a notification for the selected agent may be provided as shown in FIG. 5D. The agents that were not selected may also be provided a notification indicating that they were not selected for the engagement and may resume voting or confirming their availability for other potential engagements. Data related to the confirmed engagement such as the time and location may be saved to a confirmed engagement list on the system storage server 122.

At 515, the selected agent may choose to speak with the client through the mobile application. The user interface 220 may provide the appropriate inputs allowing the agent to submit a call request to the application server 124 to indicate that a call is desired. If the selected agent does not choose to speak with the client, the process ends. The selected agent may proceed to the engagement based on the engagement information provided by the application server 124.

If the selected agent elects to call, the application server 124 may receive the call request at the factory socket listener 240 through the factory socket 238. The request may then be forwarded to the client relations manager 126 and processed by the client relations manager 126. The call center agent may be notified of the call request who may in turn advise the client of the call and connect the selected agent with the client. The application server 124 may reroute the client's voice connection from the call center to the selected agent's the mobile application 210a. In other words, the interaction is handed off from the call center agent to the selected agent.

At 520, a voice communication channel may be established between the agent and the call center. Voice data may be transmitted using various technologies. For example, the application server 124 and mobile application may be configured to use voice over IP (VoIP) technologies to transmit voice data. For example, the mobile application may be compiled with an HTML5 soft phone framework to access one or more Session Initiation Protocol (SIP) trunk connections provided by the application server 124.

At 525, the call center agent may notify the client on the call to advise the client that the call would be handed off to the agent selected for the engagement. The handoff may be coordinated by the VoIP software integrated into the client relations manager and application server 124 so that the call between the client and the selected agent may be routed through the application server 124.

At 530, the call may be archived by the application server 124 for record keeping. While it may be understood that voice calls may be handled using other manners such as using standard telephone connections routed through a traditional telecom provider, it may be more convenient to route the call through the application server 124. Upon the agent engaging in the call, the call center is no longer involved in the interaction. By routing the call through the application server, a record of the call and the interaction may be maintained. In some cases, the conversation may be recorded and a text transcript may be generated for quality assurance.

Figure 8:
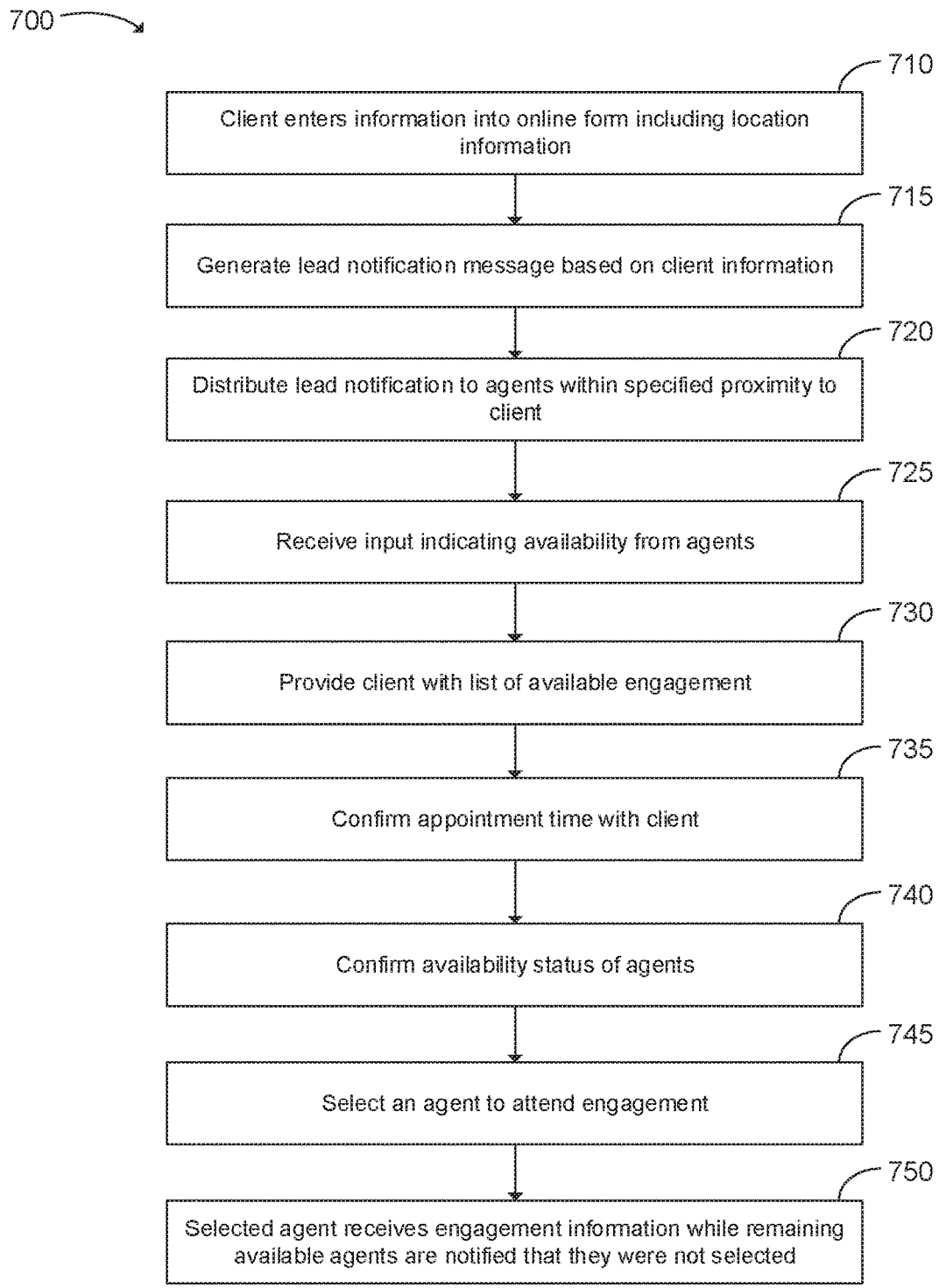
FIG. 8 is a flowchart of another example method of communicating an engagement in accordance with an example embodiment.

In some embodiments, the client may be able to set up an engagement without the assistance of a call center agent. This process may be referred to as self-directed engagement. In other words, the call center may be excluded completely from the interaction. FIG. 8 shows a flowchart that illustrates an example method 700 for communicating an engagement on a self-directed basis.

Setting up an engagement may be accomplished, for example, where the client is able to interact with the client relations manager 126 directly. The client relations manager 126 can provide a public interface, such as a webpage with content related to insurance products. For example, the webpage can include a quote estimator to allow the potential client to estimate the insurance premium for a particular type of insurance product. The webpage may be accessible by anyone with access to the Internet and can accept input from a user to collect information needed to generate a lead.

At 710, a potential client visits the webpage and can enter information into an online form. The information can include location data. An example portion of the webpage is shown in FIG. 7. The web page interface can include a drop-down control 620 to enable the potential client to select the type of insurance coverage desired. An input field 640 may be provided to allow the client to input their postal code to indicate their area of residence, since insurance premiums may vary depending on location. By activating the "Get a Quote" control 640, the information entered into the controls 620 and 640 is submitted to the client relations manager 126, and a lead notification message can be generated for distribution to nearby active agents at 715.

At 720, nearby active agents may be identified as described with respect to 320 of FIG. 4, and lead notifications may be distributed in a manner similar to 325 of FIG.

4. Responses confirming the availability of nearby agents may be received by the application server 124 at 725 (similar to the method described with respect to 330 of FIG. 4). Upon receipt of the agent responses, the application server 124 may indicate to the client relations manager 126 that agents are available for an engagement with the client. The webpage may then include a notification message to indicate to the potential client that agents are available for an engagement.

At 730, the webpage interface may generate a notification message that includes one or more engagement times that may be selected by the client.

At 735, an engagement may be confirmed with the client if the client selects an available time slot. Similar to 340, 345 and 350 of FIG. 4, at 740, 745 and 750, the availability of the nearby agents may be confirmed, an agent may be selected for the engagement, and the notifications may be distributed regarding the results of the selection process, respectively.

The method 500 described with respect to FIG. 6 may continue from method 600, in some embodiments. For example, after an agent is selected for the engagement, the selected agent may elect to communicate directly with the potential client. The potential client's user interface may be updated by the client relations manager 126 to indicate to the client whether the client wishes to speak directly with the agent selected for the engagement, prior to meeting in person. If the potential client agrees to speak with the selected agent, the potential client may be asked by the client relations manager 126 to input their telephone number (if not already available) and a phone call may be established. This call may be routed through the application server 124 so that a record of the interaction may be made and a text transcript may be generated for quality assurance.

Figure 9:
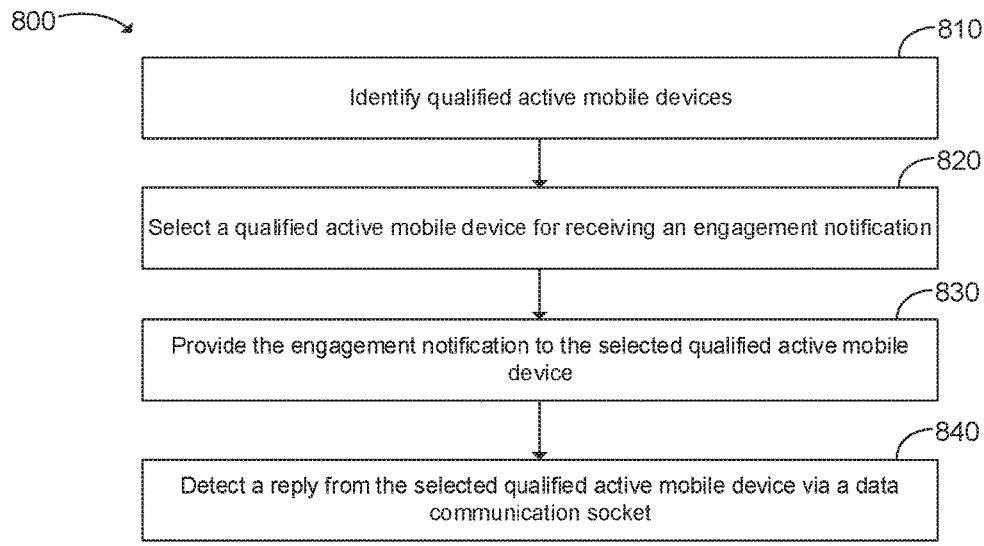
FIG. 9 is a flowchart of another example method of communicating an engagement in accordance with an example embodiment.

Referring now to FIG. 9, which is a flowchart of another example method 800 of communicating an engagement with the systems described herein.

At least one data communication socket is provided for each active mobile device, such as agent device 210 of FIG. 2. The data communication socket provided for each active mobile device can include a location data communication socket for communicating data related to location and a secondary data communication socket for communicating data other data.

At 810, the messaging system 120 identifies a qualified active mobile device.

An active mobile device is qualified when that mobile device is associated with a user account that has been assigned a qualified account type. An unqualified account type refers to user accounts that are not qualified account types.

A user account can be assigned the qualified account type based on different criteria. In some embodiments, a user account can be assigned the qualified account type when that user account is qualified to sell a set of certain products. This can encourage the agents to offer specific products so that they can continue to benefit from receiving engagements from the messaging system 120. For example, within the insurance field, the user account can be a qualified user account when that user account sells a certain brand or brands of insurance products. When a user account sells both Specialty Life Insurance™ (SLI) and IVARI™ products, for example, that user account will be assigned the qualified account type. Other products can be identified for determining whether a user account is a qualified account type.

In some embodiments, the messaging system 120 can identify a qualified active mobile device by identifying agencies that are associated with a qualified account type and identify the agents within the identified agencies. Some agencies may need to be excluded due to regulatory or other limitations, such as the absence of agents in the jurisdiction of interest.

In some embodiments, the qualified active mobile devices can be identified from active mobile devices near the engagement location to expedite the engagement, as described with reference to FIGS. 4 and 8, for example.

At 820, the messaging system 120 selects a qualified active mobile device for receiving an engagement notification.

From the active mobile devices identified to be qualified active mobile devices at 810, the messaging system 120 can then select one qualified active mobile device to receive the engagement notification. The messaging system 120 can select a qualified user account with a preferred record to receive the engagement notification. The preferred record can be identified based on one or more factors, such as performance of the agent, responsiveness of the agent, whether the agent is connected to a preferred agency, the brands most frequently sold by the agent, and other related factors.

In some embodiments, the preferred record can include a performance record with a highest sales record. The sales record can be determined from the sales by an agent within a certain time period, such as the most recent 30 or 60 days, or can be determined from an average sale over a number of engagements. In some embodiments, the preferred record can correspond to an account level of a user account. Each user account can be assigned an account level that is reflective of the performance and/or seniority of that user.

In some embodiments, each user account can be limited to a number of engagements within an engagement period. Prior to forwarding the engagement notification, the messaging system 120 can determine whether the user account has exceeded a maximum number of engagements for the engagement period and if so, another user account is selected to receive the engagement notification.

At 830, the messaging system 120 provides the engagement notification to the selected qualified active mobile device. The messaging system 120 can then forward the engagement notification to the selected qualified active mobile device. The engagement notification can include controls for receiving a reply from the agent operating the selected qualified active mobile device.

At 840, the messaging system 120 detects a reply from the selected qualified active mobile device via the data communication socket. After communicating the engagement notification, the messaging system 120 waits for a reply to indicate whether the selected agent accepts or declines the engagement. It is possible that no reply is received from the selected agent. The messaging system 120 can store the type of reply received and that reply can affect the record of that user. For example, if a selected agent frequently fails to reply to the engagement notification, the messaging system 120 can determine that the agent is not interested and/or responsive to the engagements, and the messaging system 120 can stop forwarding the engagements to that agent or decrease the preference level of that agent.

Figure 10:
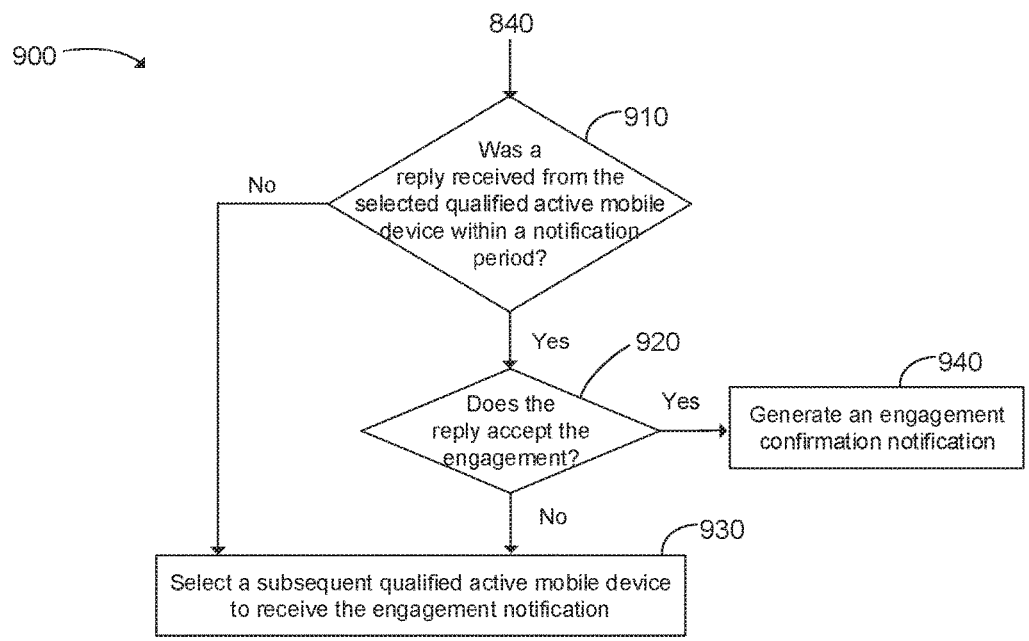
FIG. 10 is a flowchart of an example method of communicating an engagement to a subsequent device in accordance with an example embodiment.

FIG. 10 shows an example method of communicating the engagement to a subsequent agent device 210.

At 910, the messaging system 120 determines whether a reply was received from the selected qualified active mobile device within a notification period. If the reply is received within the notification period, the messaging system 120 then proceeds to 920, otherwise, the messaging system 120 proceeds to 930.

The notification period can vary with the urgency of the engagement as determined from the type of product/service, the time of the requested engagement and other factors. In some embodiments, the notification period can be 30 minutes.

At 920, the messaging system 120 determines whether the reply indicates an acceptance of the engagement. If so, the messaging system 120 generates an engagement confirmation notification at 940 and transmits the engagement confirmation notification to the selected qualified active mobile device. The engagement confirmation notification can include a portion of the engagement information, such as personal information about the potential client, the engagement location, and/or other relevant information regarding the engagement.

However, if the reply declines the engagement, the messaging system 120 selects a subsequent qualified active mobile device to receive the engagement notification at 930.

The messaging system 120 can select the subsequent qualified active mobile device by identifying the qualified user with the next highest sales record.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

The embodiments of the systems and methods described herein may be implemented in hardware or software, or a combination of both. These embodiments may be implemented in computer programs executing on programmable computers each including at least one processor, a data storage system (including volatile and non-volatile memory and/or storage elements), and at least one communication interface. For example and without limitation, the programmable computers may be a server, network appliance, embedded device, computer expansion module, a personal computer, laptop, personal data assistant, cellular telephone, smart-phone device, tablet computer, a wireless device or any other computing device capable of being configured to carry out the methods described herein.

Each program may be implemented in a high level procedural or object oriented programming and/or scripting language to communicate with a computer system. However, the programs may be implemented in assembly or machine language, if desired. In any case, the language may be a compiled or interpreted language. Each such computer program may be stored on a storage media or a device (e.g. ROM or magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium can be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims. Also, in the various user interfaces illustrated in the drawings, it will be understood that the illustrated user interface text and controls are provided as examples only and are not meant to be limiting. Other suitable user interface elements may be possible.

The invention claimed is:

1. A method of communicating an engagement to a plurality of active mobile devices, wherein each active mobile device is associated with an active user, the method comprising:

providing at least one data communication socket for each active mobile device in the plurality of active mobile devices, wherein the at least one data communication socket comprises a location data communication socket and a secondary data communication socket;

receiving a plurality of location data streams, wherein each location data stream comprises location data corresponding to a physical location of each active mobile device, and wherein the location data is communicated via the location data communication socket;

receiving engagement information comprising at least an engagement location;

in response to receiving the engagement information, identifying one or more qualified active mobile devices near the engagement location, wherein identifying the one or more qualified active mobile device comprises:

(i) detecting a set of nearby active mobile devices, wherein the set of nearby active mobile devices comprises one or more active mobile devices within a proximity threshold of the engagement location; and (ii) selecting the one or more qualified active mobile devices from the set of nearby active mobile devices by identifying the nearby active mobile devices associated with a qualified user account;

selecting a qualified active mobile device from the identified one or more qualified active mobile devices for receiving an engagement notification, wherein the selected qualified active mobile device corresponds to the qualified user account with a preferred record;

providing the engagement notification to the selected qualified active mobile device; and detecting a reply from the selected qualified active mobile device via the second data communication socket.

2. The method of claim 1, wherein identifying the nearby active mobile devices associated with the qualified user account comprises:

determining an account type associated with each user account corresponding to each nearby active mobile devices of the set of nearby active mobile devices, wherein the account type comprises a qualified account type and an unqualified account type.

3. The method of claim 2, wherein the qualified account type is assigned to a user account qualified to offer a set of products.

4. The method of claim 1, wherein selecting the qualified active mobile device from the identified one or more qualified active mobile devices for receiving the engagement notification comprises:

determining a performance record associated with each user account corresponding to the identified one or more qualified active mobile devices, wherein the preferred record comprises the performance record with a highest sales record.

5. The method of claim 1, wherein detecting the reply from the selected qualified active mobile device via the second data communication socket comprises:

receiving the reply from the selected qualified active mobile device; and in response to an acceptance of the engagement, transmitting at least a portion of the engagement information to the selected qualified active mobile device, and in response to a decline of the engagement, selecting a subsequent qualified active mobile device from the identified one or more qualified active mobile devices to receive the engagement notification.

6. The method of claim 5, wherein selecting the subsequent qualified active mobile device from the identified one or more qualified active mobile devices to receive the engagement notification comprises:

selecting a qualified active mobile device from the identified one or more qualified active mobile devices that corresponds to the qualified user with a next highest sales record.

7. The method of claim 1, wherein detecting the reply from the selected qualified active mobile device via the second data communication socket comprises:

determining whether the reply is received within a notification period; and in response to determining the reply is received within the notification period, generating an engagement confirmation notification to the selected qualified active mobile device, otherwise, selecting a subsequent qualified active mobile device from the identified one or more qualified active mobile devices to receive the engagement notification.

8. The method of claim 1, wherein selecting the qualified active mobile device from the identified one or more qualified active mobile devices for receiving the engagement notification comprises:

determining an account level associated with each user account corresponding to the identified one or more qualified active mobile devices, wherein the preferred record comprises the account level with at least one of a highest seniority and a highest sales record.

9. A system for communicating an engagement to a plurality of active mobile devices, wherein each active mobile device is associated with an active user, the system comprising:

a communication interface;

a non-transitory memory;

a computer processor configured to execute instructions stored in the non-transitory memory to:

establish, at the communication interface, at least one data communication socket for each active mobile device, wherein the at least one data communication socket comprises a location data communication socket and a secondary data communication socket;

receive, at the communication interface, a plurality of location data streams, wherein each location data stream comprises location data corresponding to a physical location of each active mobile device, and wherein the location data is communicated via the location data communication socket;

receive, at the communication interface, engagement information comprising at least an engagement location;

in response to receiving the engagement information, identify one or more qualified active mobile devices near the engagement location by:

(i) detecting a set of nearby active mobile devices, wherein the set of nearby active mobile devices comprises one or more active mobile devices within a proximity threshold of the engagement location; and (ii) selecting the one or more qualified active mobile devices from the set of nearby active mobile devices by identifying the nearby active mobile devices associated with a qualified user account;

select a qualified active mobile device from the identified one or more qualified active mobile devices for receiving an engagement notification, wherein the qualified active mobile device corresponds to the qualified user account with a preferred record;

provide the engagement notification to the selected qualified active mobile device; and detect a reply from the selected qualified active mobile device via the second data communication socket.

10. The system of claim 9, wherein the qualified user account comprises a user account qualified to offer a set of products.

11. The system of claim 9, wherein the computer processor is configured to:

determine a performance record associated with each user account corresponding to the identified one or more qualified active mobile devices, wherein the preferred record comprises the performance record with a highest sales record.

12. The system of claim 9, wherein the computer processor is configured to:

receive the reply from the selected qualified active mobile device; and in response to an acceptance of the engagement, transmit at least a portion of the engagement information to the selected qualified active mobile device, and in response to a decline of the engagement, select a subsequent qualified active mobile device from the identified one or more qualified active mobile devices to receive the engagement notification.

13. The system of claim 12, wherein the computer processor is configured to:
- select a qualified active mobile device from the identified one or more qualified active mobile devices that corresponds to the preferred user with a subsequent preferred record.

14. The system of claim 9, wherein the computer processor is configured to:
- determine whether the reply is received within a notification period; and
- in response to determining the reply is received within the notification period, generate an engagement confirmation notification to the selected qualified active mobile device, otherwise, select a subsequent qualified active mobile device from the identified one or more qualified active mobile devices to receive the engagement notification.

15. The system of claim 9, wherein the computer processor is configured to:
- determine an account type associated with each user account corresponding to each nearby active mobile devices of the set of nearby active mobile devices, wherein the account type comprises a qualified account type and an unqualified account type.

16. The system of claim 9, wherein the computer processor is configured to:
- determine an account level associated with each user account corresponding to the identified one or more qualified active mobile devices, wherein the preferred record comprises the account level with at least one of a highest seniority and a highest sales record.

* * * * *